United States Patent
Jungreis et al.

[19]

[11] Patent Number: 6,134,124
[45] Date of Patent: Oct. 17, 2000

[54] UNIVERSAL DISTRIBUTED-RESOURCE INTERFACE

[75] Inventors: Aaron M. Jungreis; Edward Petrie, both of Cary, N.C.; Harold M. Stillman, Greenwich, Conn.; David Slump, Langnau am Albis, Switzerland; John Finney, Raleigh; Joseph Oravsky, Clayton, both of N.C.

[73] Assignee: ABB Power T&D Company Inc., Raleigh, N.C.

[21] Appl. No.: 09/310,291

[22] Filed: May 12, 1999

[51] Int. Cl.[7] .................................................. H02M 5/40
[52] U.S. Cl. ................................. 363/34; 363/65
[58] Field of Search .................. 363/34, 37, 50, 363/65; 307/48, 71, 82

[56] References Cited

U.S. PATENT DOCUMENTS

| | | | |
|---|---|---|---|
| 2,783,393 | 2/1957 | Lindahl et al. | 307/64 |
| 2,922,896 | 1/1960 | Öhlund | 307/68 |
| 3,665,495 | 5/1972 | Carter et al. | 307/67 |
| 4,115,704 | 9/1978 | Hannemann et al. | 307/64 |
| 4,641,232 | 2/1987 | Pitel | 363/71 |
| 5,198,698 | 3/1993 | Paul et al. | 307/64 |
| 5,532,525 | 7/1996 | Kaiser et al. | 307/64 |
| 5,563,802 | 10/1996 | Plahn et al. | 364/492 |
| 5,642,002 | 6/1997 | Mekanik et al. | 307/64 |
| 5,646,458 | 7/1997 | Bowyer et al. | 307/67 |
| 5,751,564 | 5/1998 | Dien | 363/37 |
| 5,767,591 | 6/1998 | Pinkerton | 307/64 |
| 5,801,937 | 9/1998 | Gold et al. | 363/141 |
| 5,808,376 | 9/1998 | Gordon et al. | 307/66 |
| 5,811,960 | 9/1998 | Van Sickle et al. | 322/4 |
| 5,821,630 | 10/1998 | Schutten | 290/30 R |
| 5,994,793 | 11/1999 | Bobry | 307/64 |

*Primary Examiner*—Adolf Deneke Berhane
*Attorney, Agent, or Firm*—Woodcock Washburn Kurtz Mackiewicz & Norris LLP

[57] ABSTRACT

An electronic interface couples a combination of generation and storage devices with a power grid and/or a load. The interface comprises a DC bus; a DC storage device coupled to the DC bus; a first DC-to-AC inverter (N1) having a DC port operatively coupled to the DC bus, and an AC port; a second DC-to-AC inverter (N2) having a DC port operatively coupled to the DC bus, and an AC port; a switch (S4) for electrically coupling the AC port of the second DC-to-AC inverter to a first generator or an AC storage device; a first rectifier (D1) for coupling an AC output of the first generator to the DC bus; and a second rectifier (D2) for coupling an AC output of the AC storage device to the DC bus. The electronic interface provides an efficient mechanism for integrating a variety of storage and generation devices to produce high quality power and reliability to a load as well as to facilitate interfacing of the storage and generation devices to the power grid for purposes of energy control, load leveling, and peak shaving.

19 Claims, 3 Drawing Sheets

UNIVERSAL DISTRIBUTED-RESOURCE INTERFACE

FIELD OF THE INVENTION

The present invention relates generally to power transmission and distribution systems, and more particularly to an electronic interface for energy storage, power generation and power quality devices.

BACKGROUND OF THE INVENTION

Energy storage, power generation, and power quality devices often require electronic converters, switches, and various controls to interface with the power grid, the load, and each other. This is particularly true when one or more such devices are used together. Combining one or more such devices often entails expensive duplication of electronics, switches, and control. Combining devices also often requires oversizing equipment and substantial wiring between components, and raises issues of equipment incompatibility and non-ideal overall system performance.

The present invention addresses the problem of efficiently combining a variety of storage and generation devices, for the purpose of providing high quality power and reliability to a load and interfacing of the storage and generation devices to the power grid for purposes of energy control, load leveling and peak shaving. The following sections discuss power quality/reliability devices, generators and storage devices, with emphasis on aspects of these devices that relate to interfacing them with each other, the power grid, and various loads.

Power Quality and Reliability

Power quality and reliability is usually obtained through some form of uninterruptible power supply (UPS). Standard UPSs provide continuous power to a load, even when the power grid is interrupted. In the event of a power grid interruption, a UPS will provide conditioned power to a load through the use of energy storage, typically batteries, for a short period of time ranging from milliseconds (in the case of small capacitor storage) to minutes (in the case of batteries). To obtain longer ride-through in the event of a power grid interruption, a reliable form of generated power is used.

A standard method for obtaining long term uninterrupted power involves connecting a standard UPS to an automatic transfer switch that can be powered either from the power grid or a backup generator. Such a configuration requires a substantial amount of wiring between all of the components and often requires the user to deal with communication and compatibility issues. Additionally, standard on-line UPS systems do not present a clean load to the generator, thus requiring oversizing of the generator, extra filtering, or both.

Systems that have a backup generator have the potential to operate the generator for energy savings with the addition of other system components. Additional components may include but are not limited to the following: system protection components, mechanisms for synchronizing with the grid, controls to ensure that the generator turns on and produces an appropriate amount of power at the appropriate time, safeguards to prevent power flow into the power grid, appropriate metering when reverse power flow is allowed, and communication with a system that provides real-time pricing of electricity. Such systems might also require additional communication if the generator is to be turned on remotely for purposes of safety, convenience, or possibly as part of a large system composed of many smaller generators (effectively a distributed utility).

Energy Storage Devices a. Flywheel Energy Storage

Flywheels can provide a mechanism of energy storage for an electrical system. Mechanical energy is transformed into electrical energy (and vice-versa) through a motor-generator. To provide a reasonable amount of energy storage, flywheels operate over a large speed range. The power electronics that connect the flywheel to the electrical system must therefore operate over a wide band of frequencies, and sometimes over a large range of voltages, depending on whether the flywheel motor-generator has an adjustable field coil.

Because flywheels operate over a wide band of frequencies, they cannot interface directly with the power grid or a load. An AC-to-AC converter is used to interface the flywheel with the power grid or the load. The AC-to-AC converter can either convert the AC flywheel voltage directly to AC voltage at the power grid frequency (and similarly in the reverse direction), or the converter can first rectify the AC voltage of one, and then invert the resulting DC voltage into the AC voltage with the appropriate amplitude and frequency of the other.

b. Battery Storage

Batteries are a standard method of storage for UPS systems. They operate at nearly constant DC voltage and so require an inverter to interface with the power grid or with an AC load. A controlled rectifier is used to charge the battery from the power grid or some other AC supply, such as from a generator.

c. Capacitor Storage

A small amount of capacitor storage can be obtained by placing capacitors, such as electrolytic capacitors, onto a DC bus. Super capacitors can also be used for this purpose, if they have a high enough peak output current for the application.

The useful amount of energy storage in a capacitor can be increased significantly by placing a DC-to-DC converter at the output. Thus, the output voltage can be held constant over a large range of capacitor charge. The DC-to-DC converter adds a significant amount of cost to the storage system.

d. Other Forms of Energy Storage

Other forms of energy storage exist, such as compressed air storage and super conducting magnetic energy storage. These other forms of energy can usually be interfaced with a DC bus through the addition of a controlled or uncontrolled rectifier. They sometimes also require a DC-to-DC converter.

Power Generation a. Low Speed Synchronous Generators

The majority of generators in existence are low speed synchronous generators. The output of these generators is a nearly sinusoidal voltage at the same frequency as the power grid. These generators can therefore be connected directly to an AC load.

b. Low Speed Induction Generators

Low speed induction generators must spin slightly faster than corresponding synchronous generators to generate any power. Furthermore, an external AC voltage source is placed in parallel with an induction generator for any power generation to occur. Thus, an induction generator could generate power directly into the grid, but it could not generate power directly into a load without the presence of another voltage source such as might be provided by an AC inverter.

Low speed induction generators exist primarily for applications which allow for grid-parallel operation—that is, the generator is placed in parallel with the grid, and the prime mover operates at a speed slightly faster than synchronous speed. Prime movers for induction generators do not have to operate at constant speed. They are thus useful for wind and water turbines. They can also be used with gas or steam powered turbines which were designed primarily for grid-parallel operation. Other advantages of induction generators include easy starting, low cost, and ruggedness.

c. High Speed Permanent Magnet Generators

In the past, most generators have been designed to produce power at the power grid frequency. Recent advances in materials and power electronic components has led to the production of high speed generators. The prime mover of the high speed generators can be a small turbine or anything that operates significantly faster than 3600 rpm for 60 Hz or 3000 rpm for 50 Hz supplies. High speed generators cannot be connected directly to most loads or the power grid because they operate at a frequency different from, and much higher than, the power grid frequency. High speed generators therefore require power electronics to interface with a load or to the power grid. The electronics required to interface a high speed generator with a load are similar to the electronics required for a UPS.

Recent improvements in permanent magnet and other materials has led to the production of high speed permanent magnet generators, especially for use with microturbines. When connected to a micro-turbine, these generators are typically operated as motors for starting. During this starting phase, an inverter supplies high frequency AC voltage to the stator. After the turbine has come up to speed, it provides power to a load, or directly to the power grid, through a power electronics converter. This converter often consists of a rectifier and a DC-to-AC inverter.

d. High Speed Induction Generator

High speed induction generators can be used with the same prime movers as high speed permanent magnet generators. High speed induction generators require an inverter to produce any power. This power must then be transformed to a lower frequency through the use of some form of AC-to-AC converter. The starting inverter for a high speed induction generator would be similar to that for a permanent magnet generator with the exception of simpler control and no need for very low frequency operation.

e. Other Forms of Generation

Other forms of generation exist such as fuel cells and solar cells. These forms of generation usually produce variable DC, and thus must use a DC-to-AC inverter to interface with the power grid or an AC load. In some cases, a DC-to-DC converter located between the DC bus of the inverter and the generation device reduces the size and cost of the inverter.

SUMMARY OF THE INVENTION

An electronic interface in accordance with the present invention couples a combination of generation and storage devices with a power grid and/or a load. One implementation of such an interface comprises a DC bus; a DC storage device coupled to the DC bus; a first DC-to-AC inverter (N1) having a DC port operatively coupled to the DC bus, and an AC port; a second DC-to-AC inverter (N2) having a DC port operatively coupled to the DC bus, and an AC port; a switch (S4) for electrically coupling the AC port of the second DC-to-AC inverter to a first generator or an AC storage device; a first rectifier (D1) for coupling an AC output of the first generator to the DC bus; and a second rectifier (D2) for coupling an AC output of the AC storage device to the DC bus.

The inventive electronic interface provides an efficient means for integrating a variety of storage and generation devices to produce high quality power and reliability to a load as well as to facilitate interfacing of the storage and generation devices to the power grid for purposes of energy control, load leveling, and peak shaving. Other features of the present invention are disclosed below.

DETAILED DESCRIPTION OF PREFERRED EMBODIMENTS

Overview

Storage, generation, and power quality devices often require electronics, switches, and various controls to interface with the power grid, the load, and each other. This is particularly true where one or more such devices are used together. Combining one or more such devices often entails expensive duplication of electronics, switches, and control. Combining devices also often requires oversizing equipment, substantial wiring between components, issues of equipment incompatibility and non-ideal overall system performance. The electronic interface disclosed herein provides an efficient method for integrating a variety of storage and generation devices to produce high quality power and reliability to a load as well to facilitate interfacing of the storage and generation devices to the power grid for purposes of energy control, load leveling, and peak shaving.

The exemplary embodiments of the inventive electronic interface provide the ability to interface any of the above-described storage and generation devices with the power grid and a load. Furthermore, the invention represents a system solution for uninterruptible power, thus solving compatibility and communications issues. It also allows the user to operate the storage and generation devices in a variety of ways for both uninterruptible power and grid-parallel operation of storage and generation devices.

Operation of Electronic Interface

Figure 1:
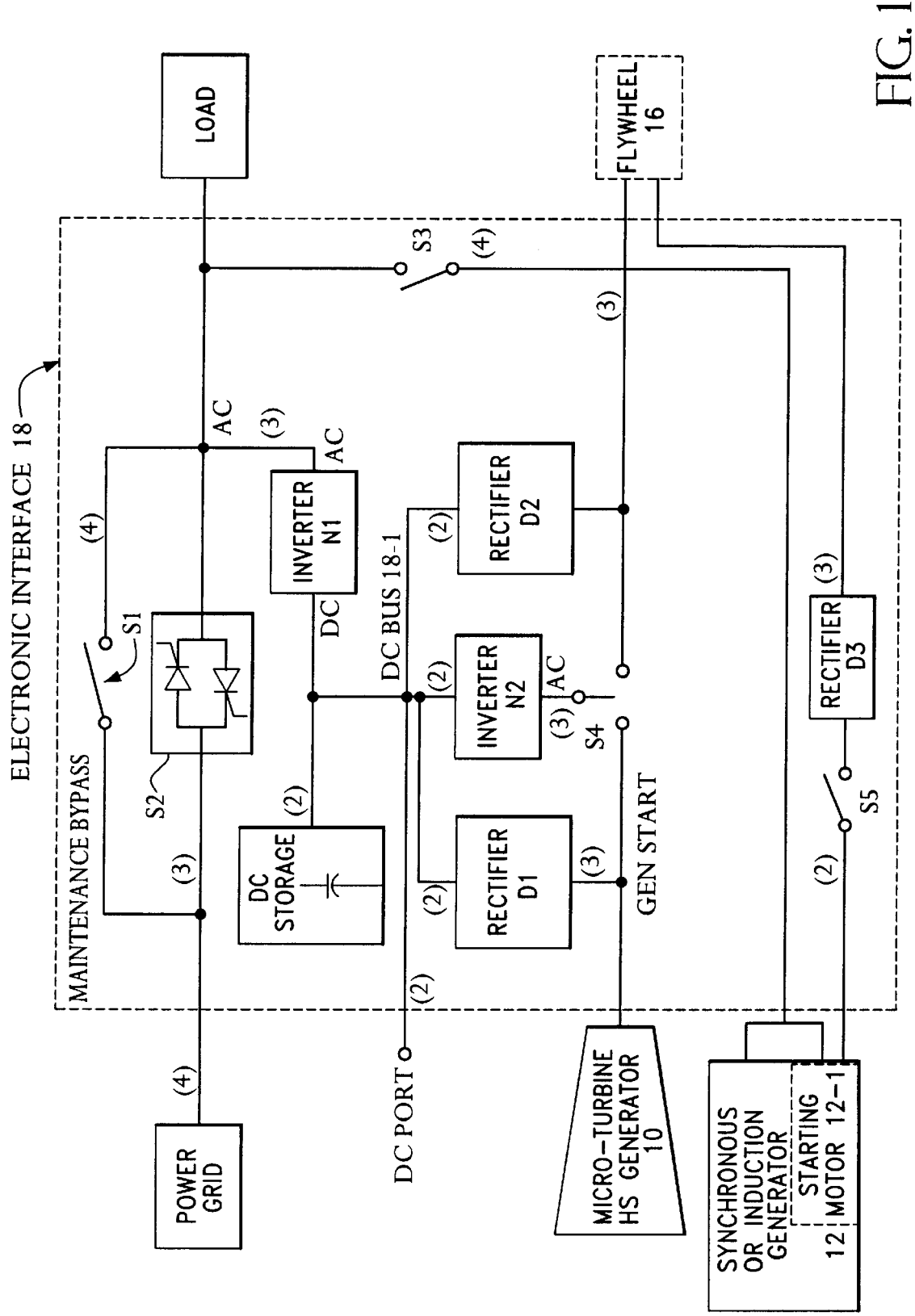
FIG. 1 schematically depicts a first, off-line embodiment of a universal interface for storage and generation devices in accordance with the present invention.

FIG. 1 depicts one preferred embodiment of a system incorporating electronic interface in accordance with the present invention. The system includes, in addition to the power grid and load, a high speed microturbine generator 10, synchronous or induction generator 12, flywheel 16 and electronic interface 18. The electronic interface 18 contains many components found in a standard UPS; however, the addition of a few more components gives the interface numerous advantages, many of which result from the overall system design, and some of which result from the additional components not found in standard UPSs.

FIG. 1 is a one-line diagram illustrating an off-line version of the electronic interface 18. The numbers in parentheses represent the number of actual power-carrying lines per diagram line (i.e., the diagram does not include earth ground or control wiring). Thus a "(2)" represents a DC line, a "(3)" represents a three-phase AC line, and a "(4)" represents a three-phase AC line with a neutral. The inverters N1 and N2 have only three lines on their outputs; however, four-line output inverters could also be used. The three lines can be converted to 4 through the use of a transformer, which need only be sized for the three-phase load imbalance, and can therefore usually be quite small.

During normal operation, static switch S2 connects the load to the power grid. Also during normal operation, inverter N1 operates in such a way as to feed power from the power grid to the DC bus 18-1. When the power grid voltage goes out of specification, static switch S2 opens and inverter N1 provides power from the DC bus to the load. When the energy reserves reach a predetermined level, a generator is started. If the generator is a low frequency generator (i.e., produces the same frequency as the power grid), such as a synchronous or induction generator 12, it is synchronized with the load voltage. After synchronization, switch S3 closes. The generator 12 then provides power directly to the load and inverter N1 reverts to charging the DC bus from the generator power. If the generator is a high frequency generator, such as microturbine generator 10, it produces power through rectifier D1 to the DC bus 18-1.

If a flywheel 16 is used for energy storage, then inverter N2 takes power from the DC bus 18-1 to motor the flywheel up to operating speed, and to keep the flywheel at peak speed during standby operation. When the power grid is out of specification and all generators are off, the flywheel 16 discharges three-phase power through rectifier D2 into the DC bus 18-1. Moreover, flywheel energy can be used directly to start a generator. This energy can be utilized several different ways: (1) a separate low-voltage three-phase winding on the flywheel can provide power through rectifier D3 to a low-voltage starting motor 12-1 on the generator; (2) the high voltage three-phase power from the flywheel can be stepped down using a small high frequency transformer (not shown) to rectifier D3 and the low-voltage starting motor 12-1; (3) a DC-to-DC converter (not shown) can step down the voltage from the DC bus 18-1 to a low voltage starting motor; or (4) the load voltage can be stepped down through a line-frequency transformer (not shown) to rectifier D3 and the low-voltage starting motor 12-1.

If a high speed synchronous generator, such as microturbine generator 10, is connected to the electronic interface 18, then it feeds power through rectifier D1 into the DC bus 18-1. If a micro-turbine or similar device drives the high speed generator, then the generator can be driven as a motor for starting the prime mover. Inverter N2 provides highfrequency three-phase voltage for driving the high speed generator 10 as a motor. The DC bus energy can then be distributed to all DC loads, to inverter N2 for charging the flywheel 16, and to inverter N1 for providing power to the load or to the power grid.

A low frequency induction generator 12 can receive exciting voltage through inverter N1 and switch S3. Thus, such a generator can be operated in parallel with the load, regardless of whether or not the power grid is attached to the load through static switch S2. The exciting voltage produced by inverter N1 can also be used to accelerate a prime mover attached to the induction generator by operating the generator as a motor.

It is also possible for inverter N1 to inject current into the power grid to provide VAR or harmonic control. The energy required for this type of control can come from a small capacitor on the DC bus, or from a flywheel, or any other storage element connected in some way to the DC bus.

Grid-Parallel Operation

The electronic interface 18 also allows any of the generator or storage devices to be run in parallel with the grid. The low speed synchronous generator 12 would be brought up to speed and synchronized with the load voltage, after which switch S3 would close bringing the generator in parallel with the power grid.

Any device that attaches to the DC bus 18-1 could pump energy back into the power grid by operating inverter N1 as a current source inverter. This type of operation allows a large variety of generation and storage devices to send energy back into the power grid. Such devices include, but are not limited to, the following: high speed generators such as may be found on turbines, flywheels, batteries, fuel cells, solar cells, and capacitors. Some of these devices would benefit from a DC-to-DC converter to provide a constant voltage to the DC bus to minimize the size of inverter N1.

Low speed induction generators can be run in parallel with the grid merely by closing switch S3. Synchronization occurs automatically since the power grid provides the excitation voltage of the induction generator. Furthermore, starting of the prime mover is facilitated since the power grid drives the induction generator as a motor until the speed approaches synchronous speed.

Grid parallel operation of any local generation or storage device calls for local protection of the device and the customer/utility interconnection for reasons including but not limited to overvoltage, overcurrent, loss of synchronism, harmonic imbalance, and faults internal and external to the local facility, the interface, and the utility's system. Common practice is to achieve this protection via operation of one or more switches (circuit breakers) controlled by electromechanical or electronic relays. Protection can also include fusing. The electronic interface 18 can combine and integrate all protective relaying activities with the same electronics used to operate the generator or storage controls and perform energy control.

Metering

The electronic interface 18 can include all necessary revenue metering activities that will record the economics of energy exchange with the utility. Integration of metering with the protection and control functions discussed above reduces the total number of electronic components required and lowers cost. In addition, the electronic interface 18 can perform all metering functions required for power quality contracts.

Energy Control

The electronic interface 18 can contain controls (not shown) that cause generators to operate in grid-parallel mode at times which are cost effective for the user. This would involve monitoring of real time pricing, and a comparison to information on current fuel prices. The generators can be operated in several different ways. Two such ways are as a constant power output, such as full power, or to follow the load power. In addition, the electronic interface 18 can accept external inputs from and generate control signals to existing building or industrial automation systems to integrate utility energy exchange with electrical loads and thermal control.

Other Embodiments of the Invention

Figure 2:
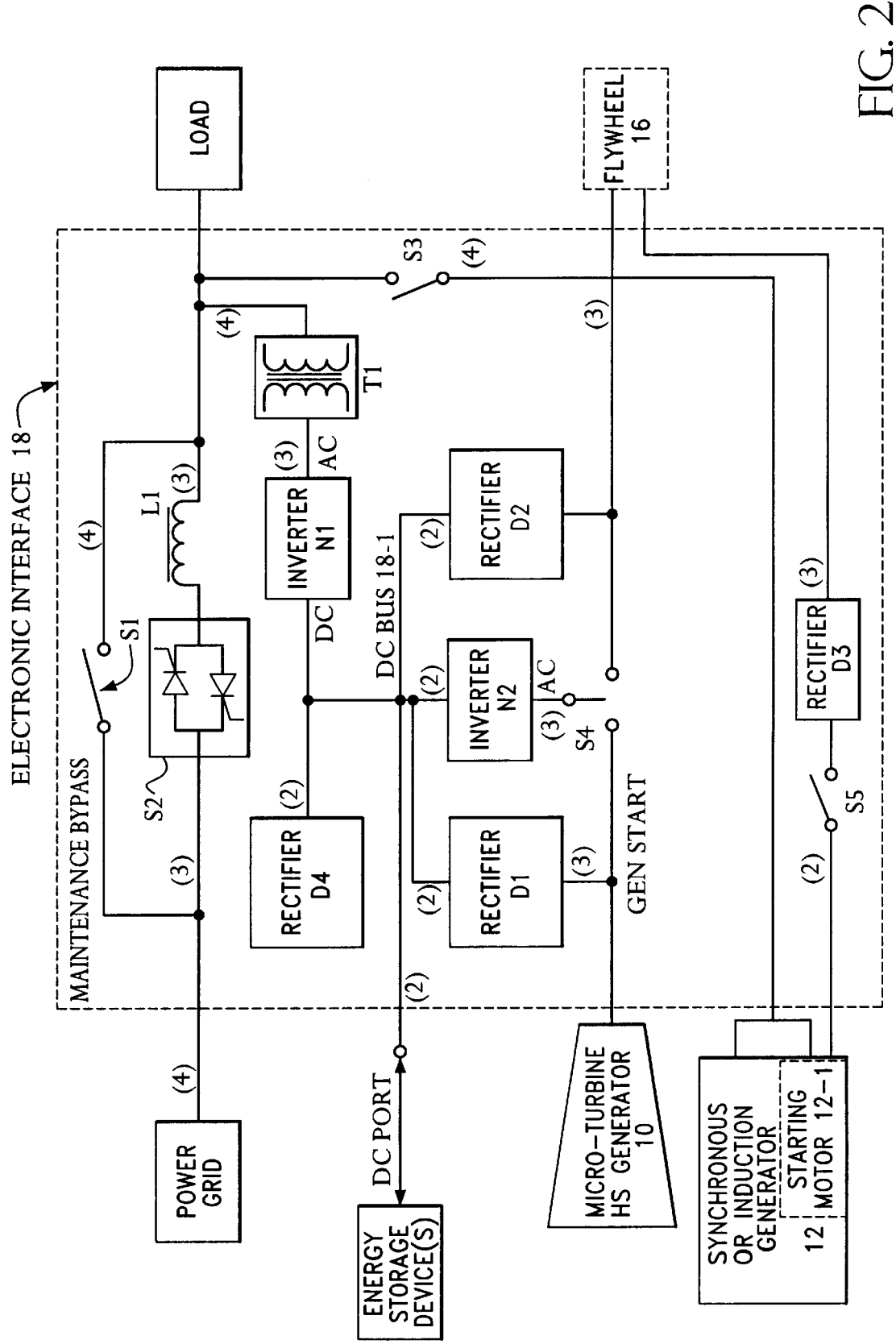
FIG. 2 schematically depicts a second, line-interactive embodiment of a universal interface in accordance with the present invention.

FIG. 2 is a one-line diagram of a second embodiment of the invention. This embodiment is the same as the first embodiment shown in FIG. 1 except that the UPS topology of the interface is line-interactive. During normal operation, the power grid provides some energy to rectifier D1. This energy can be used to charge storage devices (such as batteries and flywheels) on the DC bus 18-1. This energy also flows through inverter N1 to compensate for sags on the power grid. Inverter N1 also interacts with the power grid to compensate for all abnormal voltages on the power grid. The operation of the line-interactive system is similar to the off-line system of FIG. 1 except that the line-interactive system is able to operate over a larger range of conditions on the power grid without drawing energy from the storage device. Furthermore, even when energy is drawn from the storage device, it does not necessarily have to provide all of the load power if the power grid is able to supply some of that power. The embodiment of FIG. 2 also includes rectifiers D3 and D4, with D3 being in same location as in FIG. 1 and D4 being used instead of the DC storage device of FIG. 1 to supply DC energy from the power grid to the DC bus 18-1.

Figure 3:
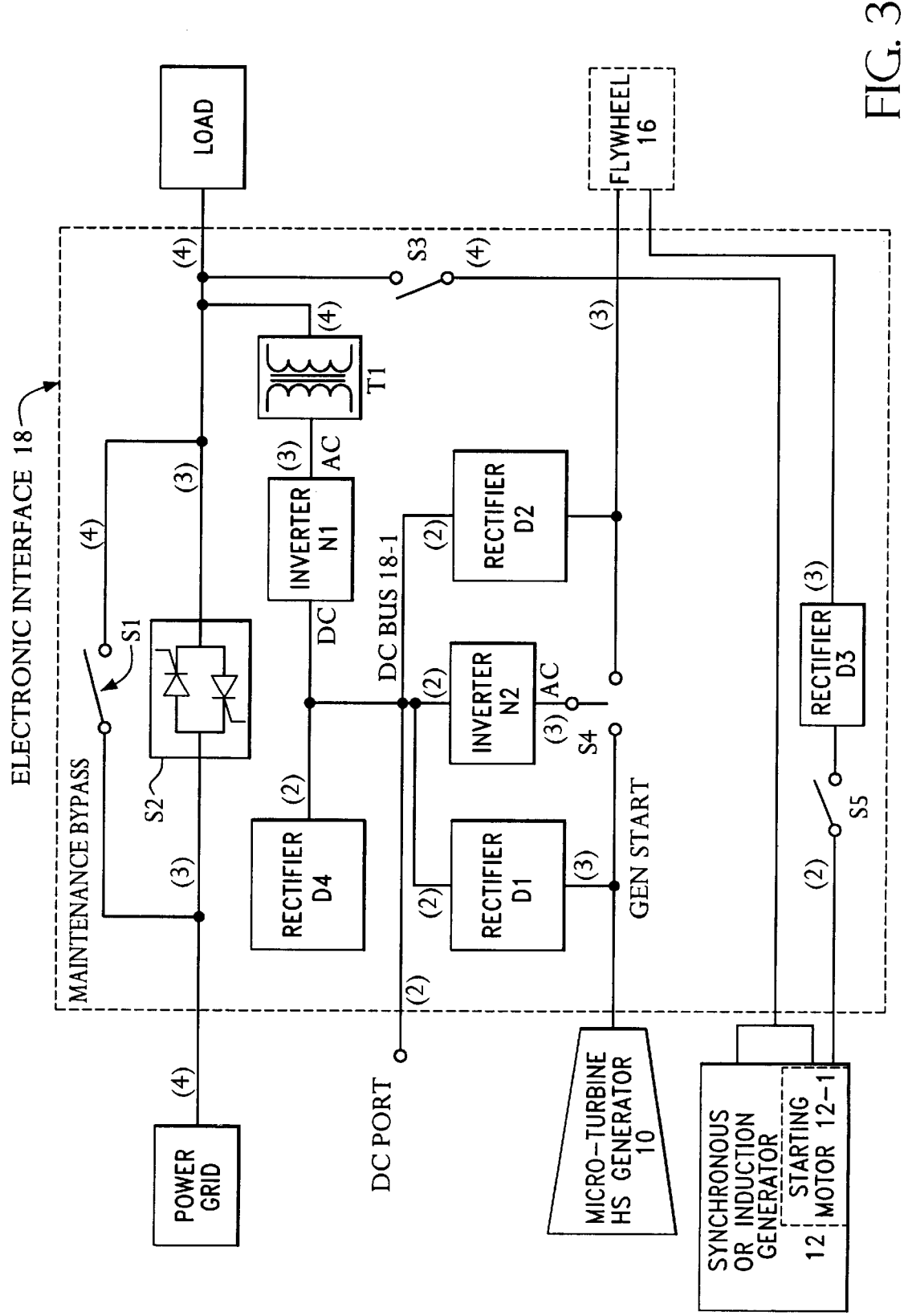
FIG. 3 schematically depicts a third, on-line embodiment of a universal interface in accordance with the present invention.

FIG. 3 is a one-line diagram of a third embodiment of the present invention. This embodiment is the same as the second embodiment of FIG. 2, except that the UPS topology is on-line. During normal operation, the power grid provides all of the load power through rectifier D1 and inverter N1. Bypass switch S2 is only required when the load current increases above the rating of inverter N1, such as would occur for faults or large inrush loads.

The operation of the embodiments shown in FIGS. 2 and 3 is the same as for the first preferred embodiment of FIG. 1 regarding interfacing with storage and generation devices. In should be noted that FIG. 1 does not have a transformer T1 whereas FIGS. 2 and 3 do. This reason for this is that, when the grid power is processed by a rectifier and inverter, the inverter output does not have the same voltage reference as the grid if the rectifier is tied to the grid. An isolating transformer restores the current reference. This is not an issue in the FIG. 1 embodiment since there is no rectifier. In addition, it should be noted that inductor L1 is included in FIG. 2 because switch S2 is normally closed but we do not want the load voltage to equal the grid voltage. Inductor L1 allows inverter N1 to add "corrections" to the load voltage.

In sum, the present invention combines a number of electronic devices in a way that it provides a "universal" interface, i.e., an interface that effectively serves as an interface between a wide variety of storage and/or generation devices, and both a grid and a load. Moreover, a generator and a flywheel may be electrically, as opposed to mechanically, connected, which thereby allows for different generator and flywheel speeds and also avoids the maintenance and shorter lifetime inherent in mechanical couplings. The invention may be embodied in various forms with various features. The following (non-exhaustive) list identifies various ways of implementing the present invention:

(1) a device which interfaces any combination of generation or storage devices with the power grid, with a load, or both, such storage and generation devices including but not limited to: batteries; low speed flywheels; high speed flywheels; capacitors; capacitors in conjunction with a DC-to-DC converter; synchronous generators attached to a diesel or reciprocating engine; induction generators attached to a diesel or reciprocating engine; high speed synchronous generators attached to fuel or steam powered turbines; induction generators attached to wind turbines; induction generators attached to water powered turbines; synchronous generators attached to constant speed wind or water powered turbines; induction or synchronous generators attached to fuel or steam powered turbines through mechanical gears; fuel cells with a DC-to-DC converter; solar batteries; Stirling or Brayton cycle engines;

(2) same as (1) in which the device contains some or all of the following:
(a) a maintenance bypass;
(b) a static switch connected between the power grid and load;
(c) a DC-to-AC inverter capable of one or more of the following: (i) providing load voltage with no other voltage sources connected to the load; (ii) providing load voltage by interacting with the power grid voltage through series impedances such as inductors; (iii) providing exciting voltage to an induction motor or generator; (iv) injecting current into the power grid to provide VAR control, harmonic control, active filtering, or power factor control; (v) sourcing current in order to boost sagging load voltage, especially but not limited to operation when the load is primarily supplied from a generator with a relatively high output impedance; (vi) taking power from the power grid or external generator and applying it to the internal DC bus of the interface;
(d) a DC-to-AC inverter capable of one or both of the following: (i) driving a high frequency generator as a motor to start a high frequency prime mover; (ii) motor a flywheel;
(e) a mechanical switch wired between the load or power grid and an external generator;
(f) a controlled or uncontrolled rectifier capable of transferring power from the power grid to the main internal DC bus;
(g) a controlled or uncontrolled rectifier capable of transferring high frequency (i.e., greater than the power grid frequency) power from a flywheel or high frequency generator to the main internal DC bus;
(h) switches to apply starting power to an external generator;
(i) controls that have the ability to do any of the following: (i) synchronize an external generator with the load voltage; (ii) provide start signals for external generators; (iii) determine best operation of grid-parallel generators based on some or all of the following information: real-time electricity cost, real-time fuel cost, start-up costs of generators, electronic loads, building thermal loads, efficiency of all devices of concern for the load conditions existing at the time of decision; (iv) perform necessary protective functions for generators, loads and the utility interconnection; (j) revenue accuracy energy and/or power quality meters; (k) a regulating transformer, such as a ferro-resonant transformer;

(3) same as (1) in which the interfacing is done in such a way as to enhance power quality and/or reliability to the load;

(4) same as (1) in which the interfacing is done in such a way as to allow cost savings on fuel consumption through the use of energy control with either storage or generation devices;

(5) same as (1) in which the interfacing is done in such a way as to both enhance power quality and/or reliability to the load;

(6) permit cost savings on fuel consumption through the use of energy control with either storage or generation devices;

(7) same as (2) in which the interface is connected to at least one storage device and at least one reliable generation device;

(8) same as (5) in which at least one of the storage devices is a low speed flywheel;

(9) same as any of the above or (8) in which a single DC-to-AC inverter is used for either motoring a flywheel or motoring a high speed motor/generator for starting its prime mover;

(10) same as any of the above in which a single DC-to-AC inverter is capable of one or more of the following functions:
(a) providing load voltage with no other voltage sources connected to the load;

(b) providing load voltage by interacting with the power grid voltage through series impedances such as inductors;

(c) providing exciting voltage to an induction motor or generator;

(d) injecting current into the power grid to provide VAR control, harmonic control, active filtering, or power factor control;

(e) sourcing current in order to boost sagging load voltage, especially but not limited to operation when the load is primarily supplied from a generator with a relatively high output impedance;

(f) taking power from the power grid or external generator and applying it to the internal DC bus of the interface.

The scope of protection of the following claims is not limited to the presently preferred embodiments described above. For example, the interface embodiments include several generation and storage elements. Different numbers or combinations are also possible, with as few as one device. Other modifications of the presently preferred embodiments will be apparent in view of the above detailed description.

We claim:

1. An electronic interface for coupling a combination of generation or storage devices with a power grid and/or a load, comprising:

a DC bus;

a DC storage device operatively coupled to the DC bus;

a first DC-to-AC inverter (N1) having a DC port operatively coupled to the DC bus, and an AC port;

a second DC-to-AC inverter (N2) having a DC port operatively coupled to the DC bus, and an AC port;

a switch (S4) for electrically coupling the AC port of the second DC-to-AC inverter to a first generator or an AC storage device;

a first rectifier (D1) for coupling an AC output of the first generator to the DC bus; and a second rectifier (D2) for coupling an AC output of the AC storage device to the DC bus.

2. An electronic interface as recited in claim 1, wherein the first generator comprises a microturbine high speed generator.

3. An electronic interface as recited in claim 1, wherein the AC storage device comprises a flywheel.

4. An electronic interface as recited in claim 1, wherein the AC port of the first DC-to-AC inverter is adapted to be electrically coupled to a load.

5. An electronic interface as recited in claim 1, further comprising a transformer (T1) for electrically coupling the AC port of the first DC-to-AC inverter to the load.

6. An electronic interface as recited in claim 1, further comprising a third rectifier (D3) for interfacing an AC output of the AC storage device to a starting motor of second generator.

7. An electronic interface as recited in claim 6, wherein the second generator comprises a synchronous generator.

8. An electronic interface as recited in claim 6, wherein the second generator comprises an induction generator.

9. An electronic interface as recited in claim 1, further comprising a static switch (S1) for electrically coupling a power grid and a load connected to the electronic interface.

10. An electronic interface as recited in claim 6, further comprising a switch (S3) for switchably coupling an AC output of the second generator to a load.

11. An electronic interface as recited in claim 1, wherein:

the first generator comprises a microturbine high speed generator;

the AC storage device comprises a flywheel;

the AC port of the first DC-to-AC inverter is adapted to be electrically coupled to a load; and the second generator comprises a member of the group consisting of a synchronous generator and an induction generator.

12. An electronic interface as recited in claim 11, further comprising:

a transformer (T1) for electrically coupling the AC port of the first DC-to-AC inverter to the load;

a third rectifier (D3) for interfacing an AC output of the AC storage device to a starting motor of second generator;

a static switch (S1) for electrically coupling a power grid and a load connected to the electronic interface; and a switch (S3) for switchably coupling an AC output of the second generator to a load.

13. An electronic interface for coupling a combination of generation or storage devices with a power grid and/or a load, comprising:

a DC bus;

a DC storage device operatively coupled to the DC bus;

a first DC-to-AC inverter (N1) having a DC port operatively coupled to the DC bus, and an AC port;

a second DC-to-AC inverter (N2) having a DC port operatively coupled to the DC bus, and an AC port;

a switch (S4) for electrically coupling the AC port of the second DC-to-AC inverter to a an AC storage device;

a first rectifier (D2) for coupling an AC output of the AC storage device to the DC bus; and a second rectifier (D3) interfacing an AC output of the AC storage device to a starting motor of a generator.

14. An electronic interface as recited in claim 13, wherein the generator comprises an induction generator.

15. An electronic interface as recited in claim 13, wherein the generator comprises a synchronous generator.

16. An electronic interface as recited in claim 13, further comprising a static switch (S1) for electrically coupling a power grid and a load connected to the electronic interface.

17. An electronic interface as recited in claim 13, further comprising a switch (S3) for switchably coupling an AC output of the generator to a load.

18. An electronic interface as recited in claim 13, further comprising means for coupling a microturbine high speed generator to the DC bus.

19. An electronic interface as recited in claim 13, wherein the AC storage device comprises a flywheel.

* * * * *